(12) United States Patent
Zhang et al.

(10) Patent No.: US 11,697,150 B2
(45) Date of Patent: Jul. 11, 2023

(54) PRODUCTION APPARATUS AND METHOD FOR PREPARING METAL CLAD PLATE IN SHORT PROCESS

(71) Applicant: BAOSHAN IRON & STEEL CO., LTD., Shanghai (CN)

(72) Inventors: Qingfeng Zhang, Shanghai (CN); Sihai Jiao, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 263 days.

(21) Appl. No.: 17/254,659

(22) PCT Filed: Jun. 24, 2019

(86) PCT No.: PCT/CN2019/092529
§ 371 (c)(1),
(2) Date: Dec. 21, 2020

(87) PCT Pub. No.: WO2020/001396
PCT Pub. Date: Jan. 2, 2020

(65) Prior Publication Data
US 2021/0276078 A1   Sep. 9, 2021

(30) Foreign Application Priority Data

Jun. 29, 2018 (CN) .......................... 201810702405.8

(51) Int. Cl.
*B22D 11/00* (2006.01)
*B22D 11/06* (2006.01)
(Continued)

(52) U.S. Cl.
CPC ........ *B22D 11/008* (2013.01); *B22D 11/0622* (2013.01); *B22D 11/0682* (2013.01); *B22D 11/124* (2013.01); *B23K 20/04* (2013.01)

(58) Field of Classification Search
CPC ....... B22D 11/00; B22D 11/008; B22D 11/06; B22D 11/0622; B22D 11/0682;
(Continued)

(56) References Cited

U.S. PATENT DOCUMENTS

2021/0276078 A1   9/2021   Zhang et al.

FOREIGN PATENT DOCUMENTS

| CN | 1141962 A | 2/1997 |
|---|---|---|
| CN | 1714957 A | 1/2006 |

(Continued)

*Primary Examiner* — Kevin P Kerns
(74) *Attorney, Agent, or Firm* — Rothwell, Figg, Ernst & Manbeck, P.C.

(57) ABSTRACT

A production apparatus for short-process metal composite plate manufacturing, the apparatus including a metal supply device including an uncoiler (1), pinch roll (2), shot blasting machine (3), welding device (4), welding pinch roll (5), induction heating apparatus (6), metal delivery machine (7), two crystallization cooling rolls (8), secondary cooling leveling roll (9), rolling mill pinch roll (10), rolling mill (11), on-line cooling apparatus (12), straightener (13), and at least one of a dividing shear (14) and a recoiling machine (15). Also disclosed is a production method for short-process metal composite plate manufacturing. The apparatus and method combine continuous casting, rolling, and heat-treating means for single material production with continuous and large-scale production of composite plate strips, and production efficiency of composite plates is sharply improved. Single-sided or double-sided composite plate production having different thickness specifications can be performed, the optional range of a base layer or cladding material is wide.

14 Claims, 1 Drawing Sheet

(51) Int. Cl.
*B22D 11/124* (2006.01)
*B23K 20/04* (2006.01)
*B21B 1/46* (2006.01)

(58) Field of Classification Search
CPC ......... B22D 11/124; B23K 20/04; B21B 1/46; B21B 1/463
USPC ........ 164/461, 476, 477, 417, 419; 228/117; 29/527.7
See application file for complete search history.

(56) References Cited

FOREIGN PATENT DOCUMENTS

| | | |
|---|---|---|
| CN | 101780532 A | 7/2010 |
| CN | 102039309 A | 5/2011 |
| CN | 102962418 A | 3/2013 |
| CN | 103252369 A | 8/2013 |
| CN | 105290352 A | 8/2013 |
| CN | 103495618 A | 1/2014 |
| CN | 104249135 A | 12/2014 |
| CN | 104525566 A | 4/2015 |
| CN | 105215307 A | 1/2016 |
| CN | 105290352 A | 2/2016 |
| CN | 108160708 A | 6/2018 |
| CN | 110653261 A | 1/2020 |
| JP | 1986049748 A | 3/1986 |
| JP | S6149748 A | 3/1986 |
| JP | S6149748 Y | 3/1986 |
| JP | S62206350 A | 9/1987 |
| JP | H0976078 A | 3/1997 |
| WO | WO 2018/091572 A1 * | 5/2018 ............. B23K 20/04 |

\* cited by examiner

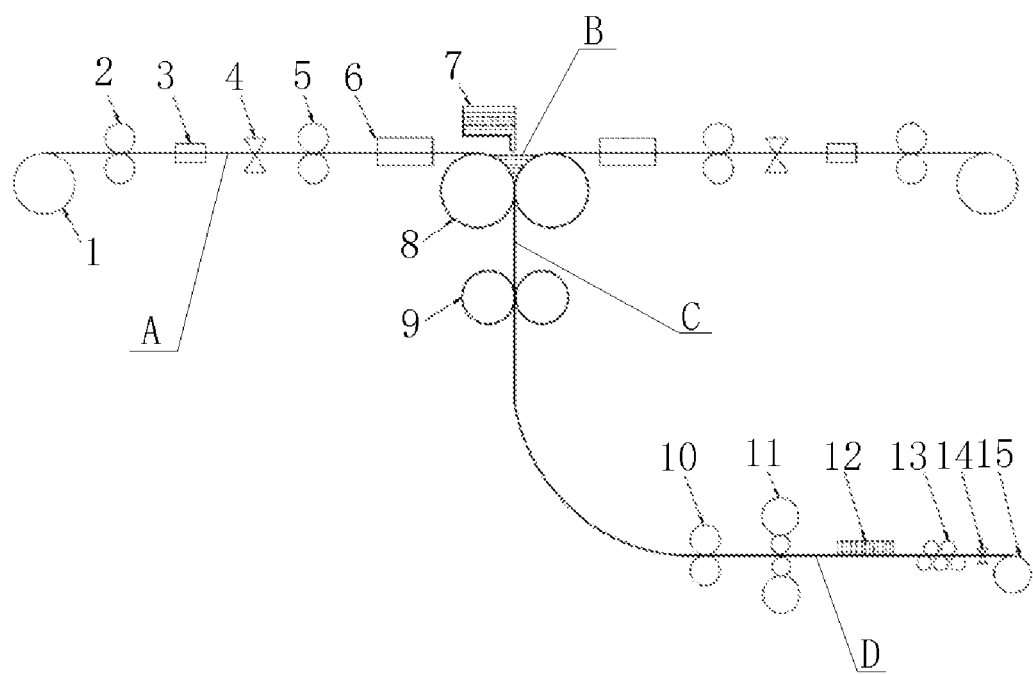

PRODUCTION APPARATUS AND METHOD FOR PREPARING METAL CLAD PLATE IN SHORT PROCESS

TECHNICAL FIELD

The present invention relates to the field of iron and steel metallurgy production, in particular to a production apparatus and method for preparing a metal clad plate in a short process, to produce metal clad plate products with different material combinations.

BACKGROUND

With the development of modern technology and national economy, users have put forward more stringent requirements for performance of materials, and a single metal material cannot meet requirements for performance in various aspects in an actual use process. Therefore, a metal cladding material that has both functionality and a structure comes into being, plays an important role in meeting individual needs of the users, and is increasingly concerned and used by the users. Several common methods and devices for manufacturing a cladding strip are as follows:

1. Explosive cladding: Clean up the contact surfaces of two different metallic materials and add explosive into the interface between them. Using the instant high temperature caused by explosion, the materials can be welded together. The cladding strip made by this method bonds insufficiently and its composite strength is low, which is only suitable for single sheet and small batch production.

2. Roll-bonded cladding: Clean the surface of stainless steel and carbon steel for composite, align them, vacuum the surrounding area and weld, then heat and roll to complete composite. The cladding strip made by this method bonds sufficiently and its composite strength is high, but the low production efficiency makes this method only suitable for single sheet and small batch production.

3. Centrifugal casted cladding: The molten carbon steel and the molten stainless steel are sequentially added to the centrifuge. The molten carbon steel and the molten stainless steel are solidified successively to form an annular composite pipe. Then the straightening, heating, rolling and other processes are carried out.

Roll-bonded cladding is currently an ideal compositing process. The cladding strip produced by this process has complete metallurgical bonding at the interface, high composite strength, and excellent product performance, but the efficiency of billet assembly is low. The billet assembly process includes multiple processes. It is difficult to realize continuous, automated and large-scale production, so the cost is high. In recent years, some processes and methods for continuous production of clad plates have emerged, such as composite plate produced by continuous casting and rolling, thin strip continuous casting, etc. For example, CN1714957A discloses a method and equipment for producing composite plates or strips of different metal materials. The continuous casting and rolling of single-sided or double-sided composite plates or strips with different metallic materials is achieved by using 2-3 casting molds for molten carbon steel and stainless steel on the same continuous casting machine. The casting mold consists of four steel strips at the top, bottom, left and right sides that perform cyclic movement simultaneously, changing the form of casting mold from the past. The base layer metal and the composited layer metal is formed by the solidification of the liquid metal in the casting mold.

CN101780532A discloses a method for continuous casting of a liquid-phase cladding slab. The base metal melt and the composite metal melt are injected separately into a roll type crystallizer molten pool formed by crystallizing rolls and side seal plates. An intermediate diaphragm separates the molten pool into a base material dissolved cavity and a composite material dissolved cavity. The cladding slab formed in the casting mold is then leveled and cut to length. The disadvantage is that as the composited layer and the base layer are formed by the solidification of molten steel at the same time, it is difficult to control the bonding, which requires to keep the two types of molten steel from mixing and to ensure that the two materials can be bonded at an appropriate temperature.

CN104249135A discloses a method for preparing double roller thin strips of a cladding strip. An intermediate strip is sent to the molten pool for continuous casting of double roller thin strips. The molten metal is solidified rapidly under the cooling action of the crystallizing roller and the intermediate strip to form single-sided or double-sided cladding strip. Similarly, CN103495618A discloses a device and method for manufacturing metal clad plates by casting and rolling. The base material to be composited is sent to the molten pool of a thin strip continuous casting machine and the molten metal to be composited in the molten pool is solidified on the surface of the base material. After secondary cooling, leveling and rolling, a cladding strip is produced. As both methods are based on the technique of continuous casting of a thin strip, the products prepared are mainly thin strips, and the thickness of the solidified composite layer is limited, which makes it not suitable for preparing cladding strips with thick composite layers.

CN105215307A discloses production technology and production equipment for a double-layer composite plate. Two tundishes and two casting molds are used to produce a composite plate by solidification of different materials in succession. The cast slab solidified in the first casting mold enters the second casting mold, so that the second material can be attached to the surface for solidification. A single-sided composite plate is then produced after secondary cooling, rolling and other working procedures.

CN1141962A discloses a reversal-fixation method for continuous production of a cladding strip. After uncoiled, descaled and passivized, the base material strip is preheated at a temperature between 200~1000° C. and enters a crystallization tank to conduct continuous compounding with the molten metal in the tank.

The patents mentioned above are new techniques developed to improve the production efficiency of composite plates and achieve continuous production while each has some disadvantages.

SUMMARY

The present invention provides a production apparatus and method for preparing a metal clad plate in a short process, to improve production efficiency of the metal clad plate and reduce production costs.

For the production apparatus and method for preparing a metal clad plate in a short process of the present invention, the apparatus and specific steps are as follows:

A production apparatus for preparing a metal clad plate in a short process is provided, including a base material supply device consisting of a uncoiler, a pinch roll, a shot blasting machine, a welding device, a welding pinch roll, and an induction heating equipment, and further including: a flow distributor, two molding cooling rolls, a secondary cooling leveling roll, a rolling mill pinch roll, a rolling mill, an online cooling equipment, a leveler, and at least one of a dividing shear and a coiler, wherein there are two base material supply devices that are arranged on both sides of the two molding cooling rolls, the flow distributor is arranged above the molding cooling rolls, and is used to cast molten steel between the two molding cooling rolls to form a molten metal pool, the two molding cooling rolls are used to respectively receive base material strips conveyed from the two base material supply devices, so that each base material strip is immersed into the molten metal pool along the corresponding molding cooling roll and then rolled into a cladding slab, the secondary cooling leveling roll is used to flatten the cladding slab conveyed from the two molding cooling rolls, the rolling mill pinch roll is used to convey the flattened cladding slab, the rolling mill is used to roll the cladding slab conveyed from the rolling mill pinch roll to form a cladding strip, the online cooling equipment is used to cool the cladding strip conveyed from the rolling mill, the leveler is used to level the cooled cladding strip, the dividing shear is used to perform cut-to-length on the leveled cladding strip, and the coiler is used to coil the leveled cladding strip.

A production method for preparing a metal clad plate in a short process by using the production apparatus for preparing a metal clad plate in a short process, comprising the following steps:

1) uncoiling a base material strip having a thickness of 2-25 mm with the uncoiler and sending it with the pinch roll to the shot blasting machine for surface cleaning; while sending base material strip having a thickness of 26-100 mm directly to the shot blasting machine by the pinch roll for surface cleaning; then welding the shot-blasted base material strips by head-to-tail with the welding device, or directly entering a next process;

2) sending the welded base material strip with the welding pinch roll to the induction heating equipment for heating, wherein the induction heating equipment is filled with nitrogen or argon protection atmosphere, a heating temperature is 100° C. to 1200° C., and a heating rate ranges from 1~50° C./s;

3) injecting molten base metal contained in the flow distributor between the two molding cooling rolls to form the molten metal pool, and blowing argon on the surface of the molten metal pool to reduce oxidation of the molten metal, wherein a temperature of the molten metal is 30~465° C. higher than a melting point of the base material strip, and the base material strip heated by step 2) enters the molten metal pool between the molding cooling rolls along the molding cooling roll at a speed of 0.1~30 m/min to melt and clads the base layer and the base material strip to form a cladding slab;

4) after coming out of the molding cooling roll, the cladding slab enters the secondary cooling leveling roll to be cooled again and makes the surface of the cladding slab deformed and flattened, wherein cooling water is introduced into the inside of the secondary cooling leveling roll or the cladding slab (C) is cooled by spraying water on all sides;

5) the cladding slab after further cooling and flattening is sent to the rolling mill pinch roll, and then enters the rolling mill to be rolled into the cladding strip with different thicknesses of 0.5~100 mm.

Optionally, the method further includes the following steps after step 5):

6) the rolled cladding strip (D) is cooled online by the online cooling equipment (12), an online cooling speed is 1~60° C./s, and a final cooling temperature is 50~600° C.;

7) The cladding strip (D) after online cooling enters the leveler (13) for leveling, and the dividing shear (14) performs cut-to-length on the leveled cladding strip (D) or the leveled cladding strip (D) is coiled by the coiler (15).

Optionally, the base material strip is one of the following materials: carbon steel, stainless steel, special alloy, titanium and copper; and the base metal is one of the following materials: carbon steel, stainless steel, special alloy, and titanium and copper.

Optionally, a single base material strip enters the molten metal pool from a surface of one molding cooling roll to form a single-sided cladding slab.

Optionally, two base material strips enter the molten metal pool from the surfaces of the two molding cooling rolls to form a double-sided cladding slab.

Optionally, a temperature of the molten metal is 100~165° C. higher than a melting point of the base material strip.

Optionally, the base material strip (A) heated by step 2) enters the molten metal pool between the molding cooling rolls at a speed of 0.1-10 m/min.

Optionally, in step 2), the heating temperature is determined by the thickness ratio of the base layer to the base material strip in the cladding slab.

Optionally, the heating temperature and the thickness ratio meet one or more of the following:

if the thickness ratio is less than 5, the heating temperature is 850~1200° C.;

if the thickness ratio is 5~10, the heating temperature is 600~850° C.;

if the thickness ratio is 10~20, the heating temperature is 300~600° C.; and if the thickness ratio is more than 20, the heating temperature is less than 300° C.

The following beneficial effects are obtained by using the production apparatus and method for preparing a metal clad plate in a short process of the present invention:

1) The production apparatus and method for preparing a metal clad plate in a short process of the present invention combines continuous casting, rolling, and heat treatment methods used in the production of a single material with continuous and large-scale production of the cladding strip, so that the production efficiency of clad plates is greatly improved.

2) The production apparatus and method for preparing a metal clad plate in a short process of the present invention can produce single-sided or double-sided clad plates with different thicknesses. The base-layer material or the clad-layer material can be selected in a wide range, including carbon steel, stainless steel, and special alloy, titanium, copper, etc.

3) The production apparatus and method for preparing a metal clad plate in a short process of the present invention implements continuous casting and continuous rolling of the clad plate, so that energy consumption is reduced, and costs are reduced.

BRIEF DESCRIPTION OF DRAWINGS

FIG. 1 is a schematic diagram of a specific structure of an apparatus part of a production apparatus and method for preparing a metal clad plate in a short process of the present invention.

In FIG. 1, 1—uncoiler, 2—pinch roll, 3—shot blasting machine, 4—welding device, 5—welding pinch roll, 6—induction heating equipment, 7—flow distributor, 8—molding cooling roll, 9—secondary cooling leveling roll, 10—rolling mill pinch roll, 11—rolling mill, 12—online cooling equipment, 13—leveler, 14—dividing shear, 15—coiler, A—base material strip, B—molten metal pool, C—cladding slab, D—cladding strip.

DETAILED DESCRIPTION OF EMBODIMENTS

A production apparatus and method for preparing a metal clad plate in a short process of the present invention is further described below with reference to the accompanying drawings and embodiments.

Referring to FIG. 1, the present invention provides a production apparatus for preparing a metal clad plate in a short process, including a base material supply device composed of a uncoiler (1), a pinch roll (2), a shot blasting machine (3), a welding device (4), a welding pinch roll (5), and an induction heating equipment (6), and comprising a flow distributor (7), two molding cooling rolls (8), a secondary cooling leveling roll (9), a rolling mill pinch roll (10), a rolling mill (11), an online cooling equipment (12), a leveler (13), and at least one of a dividing shear (14) and a coiler (15).

There are two base material supply devices that are arranged on both sides of the two molding cooling rolls (8). The flow distributor (7) is arranged above the molding cooling roll (8), and is used to cast molten steel between the two molding cooling rolls (8) to form a molten metal pool (B). The two molding cooling rolls (8) are used to receive base material strips (A) conveyed from two base material supply devices, so that each base material strip (A) is immersed in a molten metal pool along the corresponding molding cooling roll (8), and then is rolled into a cladding slab (C). The secondary cooling leveling roll (9) is used to flatten the cladding slab (C) conveyed from the two molding cooling rolls (8). The rolling mill pinch roll (10) is used to convey the flattened cladding slab (C). The rolling mill (11) is used to roll the cladding slab (C) conveyed from the rolling mill pinch roll (10) to form a cladding slab (D). The online cooling equipment (12) is used to cool the cladding strip (D) conveyed from the rolling mill (11). The leveler (13) is used to level the cooled cladding strip (D). The coiler (15) is used to coil the leveled cladding strip (D).

The present invention further provides a production method for preparing a metal clad plate in a short process, and specific steps of the production method are as follows:

1) uncoiling a base material strip (A) having a thickness of 2-25 mm with the uncoiler (1) and sending it with the pinch roll (2) to the shot blasting machine (3) for surface cleaning; while sending base material strip having a thickness of 26-100 mm directly to the shot blasting machine (3) by the pinch roll (2) for surface cleaning; then welding the shot-blasted base material strips by head-to-tail with the welding device (4) so as to achieve continuous supply of base material strips or supply of single base material strip (thick specification);

2) sending the welded base material strip with the welding pinch roll (5) to the induction heating equipment (6) for heating, wherein the induction heating equipment is filled with nitrogen or argon protection atmosphere, a heating temperature is 100° C. to 1200° C., and a heating rate ranges from 1~50° C./s according to different thicknesses. Since the base material strip is a metal such as carbon steel, stainless steel, special alloy, titanium, and copper, the purpose of heating is to make the base material strip and the cladding molten metal in the subsequent steps easier to be cladded and to promote melting of the metal on the surface of the base material.

Thereinto, the heating temperature can be determined by a thickness ratio of the base layer to the base material strip in the cladding slab. Optionally, the heating temperature and the thickness ratio meet one or more of the following: if the thickness ratio is less than 5, the heating temperature is 850~1200° C.; if the thickness ratio is 5~10, the heating temperature is 600~850° C.; if the thickness ratio is 10~20, the heating temperature is 300~600° C.; and if the thickness ratio is more than 20, the heating temperature is less than 300° C.

3) The base molten metal contained in the flow distributor (7) is injected between the two molding cooling rolls (8) to form a molten metal pool (B), argon is blown on the surface of the molten metal pool to reduce oxidation of the molten metal, and the temperature of the molten metal is 30~165° C. higher than the melting point of the base material strip. If the temperature of the molten metal is less than 30° C. or greater than 165° C., it is not conducive to metallurgical bonding. Preferably, the temperature of the molten metal is 100-165° C. higher than the melting point of the base material strip. The base metal can be carbon steel, stainless steel, special alloys, titanium, copper, etc. The base material strip (A) heated in step 2) enters the molten metal pool between the molding cooling rolls along the molding cooling roll at a speed of 0.1-30 m/min. If the base material strip enters the molten metal pool between the molding cooling rolls at a speed greater than 30 m/min, it is not conducive to the bonding of the cladding boundary. Preferably, the base material strip (A) heated in step 2) enters the molten metal pool between the molding cooling rolls at a speed of 0.1-10 m/min.

The high-temperature molten metal is in contact with the surface of the base material strip with relatively low-temperature, so that the surface of the base material slightly melts. At the same time, the molten metal as the base layer solidifies on the surface of the base material strip with relatively low-temperature to implement melting and cladding of the base layer and the base material strip. The molten metal gradually solidifies under the combined action of the base material strip with relatively low-temperature and the molding cooling roll, and is rolled into a cladding slab (C), wherein a single base material strip enters the molten metal pool from the surface of a molding cooling roll, so that a single-sided cladding slab can be produced, and the two base material strips enter the molten metal pool from the surfaces of two molding cooling rolls, so that a double-sided cladding slab can be produced.

4) The cladding slab (C) comes out of the molding cooling roll and then enters the secondary cooling leveling roll (9). Secondary cooling is performed on the cladding slab by the secondary cooling leveling roll and the surface is deformed and flattened. Thereinto, cooling water is introduced into the inside of the secondary cooling leveling roll or the cladding slab (C) is cooled by spraying water on all sides, so that the cladding slab that is incompletely solidified is further solidified in this step.

5) The cladding slab after further cooling and flattening is sent to the rolling mill pinch roll (10), and then enters the rolling mill (11) to be rolled into a cladding strip (D) with different thicknesses of 0.5~100 mm. During the rolling process, the clad interface of the cladding strip is further compressed and deformed at high temperature, the microstructure of the clad interface structure recovers and recrystallizes, a grain growth and element diffusion under high temperature promotes the recombination of the interface.

Further, after step 5), the following steps may be included:

6) the rolled cladding strip (D) is cooled online by online cooling equipment (12) according to the desired product performance, the online cooling rate ranges from 1-60° C./s, and the finish cooling temperature ranges from 50-600° C. depending on the thickness of the product. The cooling process is mainly to meet performance requirements of different types of clad plates.

7) the cladding strip (D) after the online cooling enters the leveler (13) for leveling, the dividing shear (14) is used to perform cut-to-length on the leveled cladding strip (D), and the coiler (15) is used to coil the leveled cladding strip (D) according to actual needs.

In order to improve the cladding effect, the present invention can implement cladding by adjust one or more of three means of the preheating temperature of the base material, the temperature of the molten metal and the running speed of the base material strip after heating according to the thickness of the base material strip. Therefore, the present invention is suitable for the production of single-sided or double-sided clad plates by using base material strips of various thicknesses. The thickness of the base material strips can range from 2 to 100 mm, and the thickness of the clad plate can range from 0.5 to 100 mm. Preferably, the thickness of the base material strip may range from 2 to 50 mm, and the thickness of the clad plate may range from 3 to 12 mm.

Hereinafter, the present invention is further described in detail by using embodiments, but the present invention should not be limitedly understood based on the description of the embodiments.

Embodiment 1—Double-Side Clad Plate

1) The 316L with a thickness of 2 mm used as the cladding material is provided by the base material supply devices on both sides, that is, the two base material strips (A) are respectively uncoiled by the uncoiler (1) and then sent by the pinch roll (2) to the shot blasting machine (3) for surface cleaning, and the steel plate after shot blasting enters the welding device (4) to complete welding of the tail of the previous steel plate and the head of the current-coil steel plate, implementing continuous supply of the cladding 316L.

2) The welded cladding 316L steel plate is sent to the induction heating equipment (6) by the welding pinch roll (5) for heating, the thickness ratio of the base metal to the base material strip is 2.5, the heating temperature is 850° C., the induction heating equipment is protected by the introduced nitrogen, and the heating rate is 10° C./s.

3) The heated cladding 316L steel plate (the melting point is 1445° C.) passes through the molten metal pool (B) at 3 m/min along the surface of the molding cooling roll (8), the Q235B molten steel in the flow distributor (7) is cast into the molten metal pool (B) between the two molding cooling rolls (8), the casting temperature is 1610° C., the surface of the molten pool is blown with argon to reduce oxidation of the molten steel, the Q235B molten steel is in contact with the surface of 316L and solidifies, and the surface of the cladding 316L steel plate is slightly melted to implement the preliminary melting and cladding of the clad layer and the base layer, forming the cladding slab (C) with the base layer Q235B and the cladding 316L steel plate. The cladding slab (C) is a double-sided cladding slab with a thickness of 2+10+2 mm.

4) The cladding slab (C) exits from the molding cooling roll (8) and then enters the secondary cooling leveling roll (9). Cooling water is introduced into the inside of the secondary cooling leveling roll (9) for cooling. The incompletely solidified cladding slab (C) is in contact with the surface of the secondary cooling leveling roll (9) to cool down to further solidify, and at the same time, the secondary cooling leveling roll (9) gives a slight surface pressure to improve the surface quality of the cladding slab (C).

5) The rolling mill pinch roll (10) sends the cladding slab (C) into the rolling mill (11), the rolling temperature is 1120° C., the cladding strip (D) with a thickness of 3.5 mm (0.5+2.5+0.5 mm) is formed by rolling, the cladding strip (D) is a double-sided cladding strip, and the final rolling temperature is 1000° C. The cladding strip (D) obtained after rolling is cooled online by using the online cooling equipment (12), the cooling temperature is 950° C., the final cooling temperature 400° C., and the cooling rate 45° C./s.

6) The cooled cladding strip (D) enters the leveler (13) for leveling, and the leveled cladding strip is coiled by the coiler (15).

Embodiment 2—Single-Sided Clad Plate

1) The 304L with a thickness of 3 mm used as the cladding material is provided by the single-sided base material supply device, that is, the base material strips (A) are respectively uncoiled by the uncoiler (1) and then sent to the shot blasting machine (3) by the pinch roll (2) for surface cleaning, and the steel plate after shot blasting enters the welding device (4) to complete welding of the tail of the previous steel plate and the head of the current steel plate, implementing continuous supply of the cladding 304L.

2) The welded cladding 304L steel plate is sent to the induction heating equipment (6) by the welding machine pinch roll (5) for heating, the thickness ratio of the base metal to the base material strip is 2, the heating temperature is 850° C., the induction heating equipment is protected by the introduced nitrogen, and a heating rate 10° C./s.

3) The heated cladding 304L steel plate (the melting point is 1455° C.) passes through the molten metal pool (B) at 2 m/min along the surface of the molding cooling roll (8), the Q345B molten steel in the flow distributor (7) is cast into the molten metal pool (B) between the two molding cooling rolls (8), the casting temperature is 1610° C., the surface of the molten pool is blown with argon to reduce oxidation of the molten steel, the Q345B molten steel is in contact with the surface of 304L and solidifies, and the surface of the cladding 304L steel plate is slightly melted to implement the preliminary melting and cladding of the clad layer and the base layer, forming the cladding slab (C) with the base layer Q345B and the cladding 304L steel plate. The cladding slab (C) is a single-sided cladding slab with a thickness of 3+6 mm;

4) The cladding slab (C) exits from the molding cooling roll (8) and then enters the secondary cooling leveling roll (9). Cooling water is introduced into the inside of the secondary cooling leveling roll (9) for cooling. The cladding slab (C) is in contact with the surface of the secondary cooling leveling roll (9) to further cool down, and at the same time, the secondary cooling leveling roll (9) gives a slight surface pressure to improve the surface quality of the cladding slab (C).

5) The rolling mill pinch roll (10) sends the cladding slab (C) into the rolling mill (11), the rolling temperature is 1160° C., the cladding slab strip (D) with a thickness of 3 mm (1+2 mm) is formed by rolling, the cladding strip (D) is a single-sided cladding strip, and the final rolling temperature is 980° C. The cladding strip (D) obtained after rolling is cooled online by using the online cooling equipment (12), the cooling temperature is 950° C., the final cooling temperature is 420° C., and the cooling speed is 45° C./s.

6) The cooled cladding strip (D) enters the leveler (13) for leveling, and the leveled cladding strip is coiled by the coiler (15).

Embodiment 3—Single-Sided Cladding Pipeline Steel Plate

1) The 304L with a thickness of 50 mm used as the cladding material is provided by the single-sided base material supply device, that is, this thick base material strip (A) is sent to the shot blasting machine (3) by the pinch roll (2) for surface cleaning and shot blasting.

2) The thick base material strip is sent to the induction heating equipment (6) for heating, the thickness ratio of the base metal to the base material strip is 0.2, the heating temperature is 1100° C., the induction heating equipment is protected by the introduced nitrogen, and the heating speed is 5° C./s.

3) The heated cladding 304L steel plate passes through the molten metal pool (B) at 1 m/min along the surface of the molding cooling roll (8), the X70 pipeline molten steel in the flow distributor (7) is cast into the molten metal pool (B) between the two molding cooling rolls (8), a thickness is 10 mm, and the casting temperature is 1550° C. The surface of the molten pool is blown with argon to reduce oxidation of the molten steel, the X70 molten steel is in contact with the surface of the 304L having a temperature of 600° C. and solidifies, and the surface of the cladding 304L steel plate is slightly melted to implement the preliminary melting and cladding of the clad layer and the base layer, forming the cladding slab (C) with the base layer X70 and the cladding 304L steel plate. The cladding slab (C) is a single-sided cladding slab with a thickness of 10+50 mm.

4) The cladding slab (C) exits from the molding cooling roll (8) and then enters the secondary cooling leveling roll (9). Cooling water is introduced into the inside of the secondary cooling leveling roll (9) for cooling. The cladding slab (C) is in contact with the surface of the secondary cooling leveling roll (9) to further cool down, and at the same time, the secondary cooling leveling roll (9) gives a slight surface pressure to improve the surface quality of the cladding slab (C).

5) The rolling mill pinch roll (10) sends the cladding slab (C) into the rolling mill (11), the rolling temperature is 1160° C., the composite plate (D) with a thickness of 12 mm (2+10 mm) is formed by rolling, the composite plate (D) is a single-sided composite pipeline plate, and the final rolling temperature is 980° C. The composite plate (D) obtained after rolling is cooled online by the online cooling equipment (12), the cooling temperature is 780° C., the final cooling temperature is 500° C., and the cooling speed is 25° C./s.

6) The cooled composite plate (D) enters the leveler (13) for leveling, and the leveled composite plate is sent to the cooling bed for offline.

Embodiment 4—Double-Sided Clad Plate

1) The 316L with a thickness of 2 mm used as the cladding material is provided by the base material supply devices on both sides. The thickness ratio of the base metal to the base material strip is 7, the heating temperature is 730° C., the induction heating equipment is protected by the introduced nitrogen, and the heating rate is 20° C./s.

2) The heated cladding-layer 316L steel plate (the melting point is 1445° C.) passes through the molten metal pool (B) at 1 m/min along the surface of the molding cooling roll (8), the SCM435 molten steel in the flow distributor (7) is cast into the molten metal pool (B) between the two molding cooling rolls (8) at a casting temperature of 1540° C. to form a cladding slab (C) that has the base layer SCM435 and the cladding-layer 316L steel plate and that has a thickness of 2+28+2 mm.

3) The cladding slab (C) exits from the molding cooling roll (8) and then enters the secondary cooling leveling roll (9) section or the water cooling section. The incompletely solidified cladding slab (C) is further solidified and enters the rolling mill (11) at 1200° C., and is rolled into a cladding strip (D) with a thickness of 10 mm (0.625+8.75+0.625 mm). In the production apparatus and method for preparing a metal clad plate in a short process of the present invention, continuous casting, rolling, and heat treatment methods used for production of a single material are well combined with continuous and large-scale production of the cladding strip, so that production efficiency of the clad plate is greatly improved. In the present invention, single-sided or double-sided clad plates with different thicknesses can be produced, and the base material or the cladding material can be selected in a wide range, including carbon steel, stainless steel, special alloy, titanium, copper and the like. The present invention implements continuous casting and continuous rolling of the clad plates, so that energy consumption is reduced, and costs are reduced.

We claim:

1. A production apparatus for preparing a metal clad plate, the production apparatus comprising:
   two base material supply devices each including an uncoiler, a pinch roll, a shot blasting machine, a welding device, a welding pinch roll, and an induction heating equipment;
   a flow distributor;
   two molding cooling rolls;
   a secondary cooling leveling roll;
   a rolling mill pinch roll;
   a rolling mill;
   an online cooling equipment;
   a leveler; and
   at least one of a dividing shear and a coiler; wherein:
   the two base material supply devices are arranged on both sides of the two molding cooling rolls,
   the flow distributor is arranged above the two molding cooling rolls and is configured to cast molten steel between the two molding cooling rolls to form a molten metal pool,
   the two molding cooling rolls are configured to respectively receive base material strips conveyed from the two base material supply devices so that each of the base material strips is immersed into the molten metal pool along a corresponding molding cooling roll of the two molding cooling rolls and then rolled into a cladding slab,
   the secondary cooling leveling roll is configured to flatten the cladding slab conveyed from the two molding cooling rolls,
   the rolling mill pinch roll is configured to convey a flattened cladding slab,
   the rolling mill is configured to roll the cladding slab conveyed from the rolling mill pinch roll to form a cladding strip,
   the online cooling equipment is configured to cool the cladding strip conveyed from the rolling mill, the leveler is configured to level the cooled cladding strip,
the dividing shear is configured to perform cut-to-length on a leveled cladding strip, and
the coiler is configured to coil the leveled cladding strip.

2. A process for preparing a metal clad plate, the process comprising:
sending a base material strip with a pinch roll to a shot blasting machine for surface cleaning;
sending the base material strip with a welding pinch roll to an induction heating equipment for heating, wherein the induction heating equipment is filled with nitrogen or argon protection atmosphere, a heating temperature is 100° C. to 1200° C., and a heating rate ranges from 1~50° C./s;
injecting molten base metal contained in a flow distributor between two molding cooling rolls to form a molten metal pool, and blowing argon on a surface of the molten metal pool to reduce oxidation of the molten base metal, wherein a temperature of the molten base metal is 30~165° C. higher than a melting point of the base material strip, and a base material strip heated by the induction heating equipment enters the molten metal pool between the two molding cooling rolls along the two molding cooling rolls at a speed of 0.1~30 m/min to melt and clads a base layer and the base material strip to form a cladding slab;
after the cladding slab comes out of the two molding cooling rolls, using a secondary cooling leveling roll to cool the cladding slab again and make a surface of the cladding slab deformed and flattened, wherein cooling water is introduced into an inside of the secondary cooling leveling roll or the cladding slab is cooled by spraying water on all sides; and
sending the cladding slab after cooling and flattening by the secondary cooling leveling roll to a rolling mill pinch roll; and
using a rolling mill to roll the cladding slab into a cladding strip with different thicknesses of 0.5~100 mm.

3. The process for preparing the metal clad plate according to claim 2, the process further comprising:
cooling the rolled cladding strip online by an online cooling equipment, wherein an online cooling speed is 1~60° C./s, and a final cooling temperature is 50~600° C.;
using a leveler to level the rolled cladding strip after online cooling; and
using a dividing shear to perform cut-to-length on a leveled cladding strip or using a coiler to coil a leveled cladding strip.

4. The process for preparing the metal clad plate according to claim 2, wherein the base material strip is one of following materials: carbon steel, stainless steel, special alloy, titanium and copper; and a base-layer metal is one of the following materials: carbon steel, stainless steel, special alloy, titanium and copper.

5. The process for preparing the metal clad plate according to claim 2, wherein a single base material strip enters the molten metal pool from a surface of one molding cooling roll to form a single-sided cladding slab.

6. The process for preparing the metal clad plate according to claim 2, wherein two base material strips enter the molten metal pool from surfaces of the two molding cooling rolls to form a double-sided cladding slab.

7. The process for preparing the metal clad plate according to claim 2, wherein a temperature of the molten metal is 100~165° C. higher than a melting point of the base material strip.

8. The process for preparing the metal clad plate according to claim 2, wherein the base material strip heated by the induction heating equipment enters the molten metal pool between the two molding cooling rolls at a speed of 0.1-10 m/min.

9. The process for preparing the metal clad plate according to claim 2, wherein the heating temperature is determined by a thickness ratio of the base layer to the base material strip in the cladding slab.

10. The process for preparing the metal clad plate according to claim 9, wherein the heating temperature and the thickness ratio meet one or more of the following:
if the thickness ratio is less than 5, the heating temperature is 850~1200° C.;
if the thickness ratio is 5~10, the heating temperature is 600~850° C.;
if the thickness ratio is 10~20, the heating temperature is 300~600° C.; and
if the thickness ratio is more than 20, the heating temperature is less than 300° C.

11. The process for preparing the metal clad plate according to claim 2, further comprising welding the base material strip from a head to a tail with a welding device.

12. The process for preparing the metal clad plate according to claim 2, wherein the base material strip has a thickness of 2-25 mm, and the process further comprises uncoiling the base material strip with an uncoiler before the pinch roll sends the base material strip to the shot blasting machine for the surface cleaning.

13. The process for preparing the metal clad plate according to claim 2, wherein the base material strip has a thickness of 26-100 mm, and the pinch roll sends the base material strip directly to the shot blasting machine for the surface cleaning.

14. A process for preparing a metal clad plate, the process comprising:
using a flow distributor to cast molten steel between two molding cooling rolls to form a molten metal pool, wherein the flow distributor is arranged above the two molding cooling rolls;
using two base material supply devices to convey base material strips, wherein the two base material supply devices are arranged on both sides of the two molding cooling rolls, and the two base material supply devices each include an uncoiler, a pinch roll, a shot blasting machine, a welding device, a welding pinch roll, and an induction heating equipment;
using the two molding cooling rolls to respectively receive the base material strips conveyed from the two base material supply devices so that each of the base material strips is immersed into the molten metal pool along a corresponding molding cooling roll of the two molding cooling rolls and then rolled into a cladding slab;
using a secondary cooling leveling roll to flatten the cladding slab conveyed from the two molding cooling rolls;
using a rolling mill pinch roll to convey a flattened cladding slab;
using a rolling mill to roll the cladding slab conveyed from the rolling mill pinch roll to form a cladding strip;
using an online cooling equipment to cool the cladding strip conveyed from the rolling mill;
using a leveler to level the cooled cladding strip; and using a dividing shear to perform cut-to-length on a leveled cladding strip or using a coiler to coil a leveled cladding strip.

\* \* \* \* \*